(12) United States Patent
Ushinsky et al.

(10) Patent No.: US 9,001,862 B2
(45) Date of Patent: Apr. 7, 2015

(54) MINIATURIZED SOLID-STATE LASING DEVICE, SYSTEM AND METHOD

(75) Inventors: Michael Ushinsky, Irvine, CA (US); Joseph J. Ichkhan, Redondo Beach, CA (US); Derek M. Hendry, Hawthorne, CA (US)

(73) Assignee: Raytheon Company, Waltham, MA (US)

( * ) Notice: Subject to any disclaimer, the term of this patent is extended or adjusted under 35 U.S.C. 154(b) by 153 days.

(21) Appl. No.: 13/417,097

(22) Filed: Mar. 9, 2012

(65) Prior Publication Data
US 2013/0235892 A1 Sep. 12, 2013

(51) Int. Cl.
| | | |
|---|---|---|
| *H01S 5/024* | (2006.01) | |
| *H01S 3/02* | (2006.01) | |
| *H01S 3/04* | (2006.01) | |
| *H01S 3/08* | (2006.01) | |
| H01S 3/042 | (2006.01) | |
| H01S 3/06 | (2006.01) | |
| H01S 3/094 | (2006.01) | |
| H01S 3/0941 | (2006.01) | |
| H01S 3/106 | (2006.01) | |
| H01S 3/113 | (2006.01) | |
| H01S 3/16 | (2006.01) | |

(52) U.S. Cl.
CPC ............... *H01S 3/0627* (2013.01); *H01S 3/025* (2013.01); *H01S 3/0405* (2013.01); *H01S 3/042* (2013.01); *H01S 3/061* (2013.01); *H01S 3/08009* (2013.01); *H01S 3/094053* (2013.01); *H01S 3/09415* (2013.01); *H01S 3/1061* (2013.01); *H01S 3/113* (2013.01); *H01S 3/1643* (2013.01)

(58) Field of Classification Search
CPC ... H01S 3/025; H01S 3/061; H01S 3/094053; H01S 3/08031; H01S 3/08059; H01S 3/086
USPC ................................. 372/36, 102, 107, 108
See application file for complete search history.

(56) References Cited

U.S. PATENT DOCUMENTS

| | | | | |
|---|---|---|---|---|
| 4,665,529 | A | * | 5/1987 | Baer et al. ...................... 372/107 |
| 4,734,912 | A | * | 3/1988 | Scerbak et al. ................. 372/27 |
| 4,865,436 | A | | 9/1989 | Ahonen et al. |
| 5,530,714 | A | * | 6/1996 | Vilhelmsson et al. .......... 372/92 |
| 6,055,815 | A | | 5/2000 | Peterson |
| 7,648,290 | B2 | * | 1/2010 | Feve et al. ....................... 385/93 |
| 7,697,589 | B2 | | 4/2010 | Volodin et al. |
| 8,483,248 | B2 | * | 7/2013 | Ushinsky ........................ 372/34 |
| 2002/0159695 | A1 | | 10/2002 | Koshi et al. |
| 2002/0182479 | A1 | * | 12/2002 | Mallari et al. .................. 429/44 |
| 2005/0063441 | A1 | | 3/2005 | Brown |
| 2007/0116082 | A1 | | 5/2007 | Feve et al. |
| 2008/0291460 | A1 | | 11/2008 | Khatchaturov et al. |

(Continued)

OTHER PUBLICATIONS

International Search Report dated Mar. 12, 2013 in connection with International Patent Application No. PCT/US2013/021028, 3 pages.

(Continued)

*Primary Examiner* — Julio J Maldonado
*Assistant Examiner* — Michael Carter

(57) ABSTRACT

A solid-state lasing device includes a micro-chip oscillator (MCO) affixed to a first tube, and a volume Bragg grating (VBG) plate affixed to a second tube. The second tube is configured to be telescopically coupled to the first tube with a slip fit such that the VBG plate is concentrically aligned with and is positioned at a specified distance from the MCO.

20 Claims, 10 Drawing Sheets

(56) References Cited

U.S. PATENT DOCUMENTS

2009/0059980 A1* 3/2009 Braun et al. ............... 372/38.01
2009/0274188 A1 11/2009 Jang et al.
2010/0086001 A1 4/2010 Manni
2010/0303121 A1 12/2010 Alalusi et al.

OTHER PUBLICATIONS

Written Opinion of International Searching Authority dated Mar. 12, 2013 in connection with International Patent Application No. PCT/US2013/021028, 7 pages.

* cited by examiner

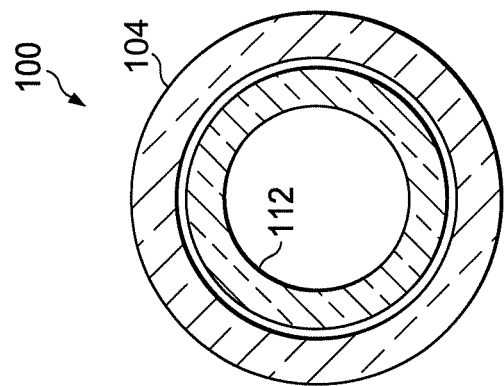
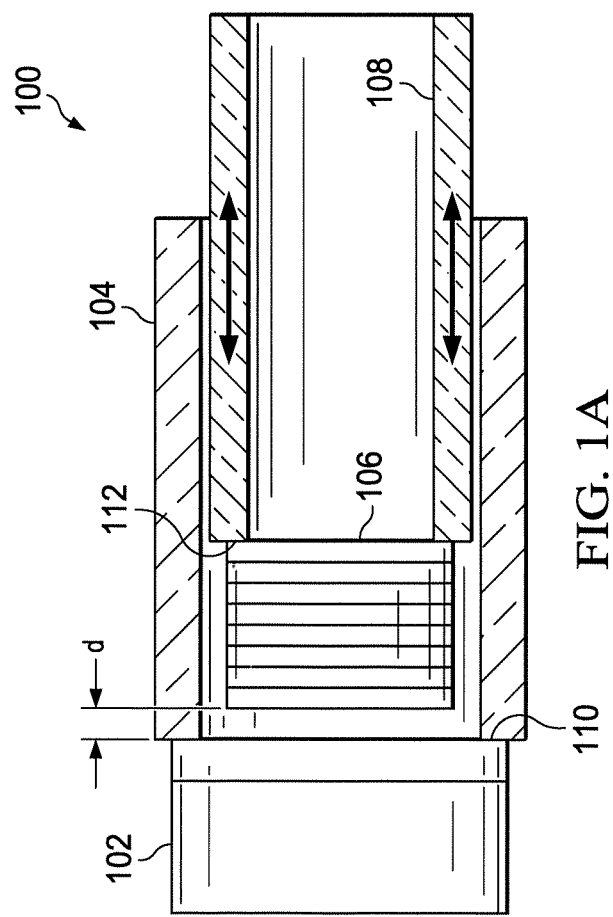
FIG. 1B
FIG. 1A

MINIATURIZED SOLID-STATE LASING DEVICE, SYSTEM AND METHOD

TECHNICAL FIELD

The present disclosure is directed in general to optical and electro-optical miniaturized devices, and more specifically to a solid-state lasing device, and related system and packaging methods.

BACKGROUND OF THE DISCLOSURE

Light amplification by stimulated emission of radiation (lasers) devices generate narrow beams of light using optical amplification. Emission from lasers can be characterized as either single-mode or multi-mode emission. Single-mode emission generally refers to light generated by a laser having only one or relatively few dominant wavelengths. On the other hand, multi-mode emission generally refers to light generated by a laser having multiple dominant wavelengths. Single-mode emission is often beneficial over multi-mode emission due to reduced noise when used for communication, and simplified optics that can be designed for operation at the dominant wavelength of operation.

Recent advances in diode-pumped solid state laser technology has facilitated development of laser devices, such as micro-chip oscillating lasers (MCOs) often used as the major component in various laser proximity sensors and fuses, space communication systems, solid state laser transmitters, and many other laser systems. The diode pumped micro-chip laser appears to be attractive in these applications because of its enhanced single-mode performance over a relatively broad frequency range. These diode pumped micro-chip lasers exhibit longitudinal modes that are widely separated so that only one or a relatively few number of modes becomes the functional oscillating mode. Besides all other requirements, the micro-chip based oscillator and its laser transmitter must provide precise and reliable single mode operations. A proper packaging approach has to facilitate a few important conditions for single-mode short pulse operations and nearly thermally independent lasing, the most important one being its ability to exclude any multi-mode and/or mixed mode operations. The temperature elevations within the laser cavity and thermal stresses in micro-chip laser often affect multi-mode and/or mixed mode operations. In some of those single mode operations, the wavelength has to be tunable, in order to permit wavelength or phase locking. These packaging approaches are essential for novel tactical laser transmitters, LADAR, and space sensor systems, and low mass proximity fuses.

Prior attempts have featured laser components coupled with commercial thermal management devices having relatively large size and poor utility for commercial and military applications. This strongly drives the need for miniaturized electro-optical laser systems and packaging designs. These designs should provide low component stresses in all the enclosure units that can be combined with low absorption of light.

SUMMARY OF THE DISCLOSURE

To address one or more of the above-deficiencies and/or other deficiencies in prior art, this disclosure provides a solid-state lasing device, and related system and method of fabrication. The disclosure details a miniaturized laser package that includes a collimated fiber optic input assembly (fiber-optic pigtail), a micro-chip laser cavity, a Fabri-Perot type outcoupler or volume Bragg grating (VBG), and configurable thermal management provisions.

A primary embodiment includes a micro-chip oscillator (MCO) affixed to a first tube, and a volume Bragg grating (VBG) plate affixed to a second tube. The first tube is configured to be telescopically coupled to the second tube with a slip fit such that the MCO is concentrically aligned with and positioned at a specified distance from the VBG plate. The proposed tubular package properly encapsulates the optical path and prevents contamination of optical and laser components.

Certain embodiments may provide various technical advantages depending on the implementation. For example, certain embodiments of the solid-state lasing device may provide one or more advantages over conventional solid-state lasing device designs. Advantages may include thermally independent operation of the MCO relative to a light generating device that feeds the MCO by using one or more remotely located fiber optic delivery systems. In certain cases, the remote fiber optic delivery system may be scaled with one or more light generating devices. Thus, heat management of the light generating device and MCO may be handled independently of one another. Another particular advantage may include providing a package in which the wavelength of the single mode light is tunable in order to provide wavelength or phase locking of the generated light beam.

In many cases, single mode functionality of a MCO/VBG lasing device may be hampered or even destroyed by secondary beating modes. Many commercially available MCO chips typically generate five to seven longitudinal modes. For many defense applications short single mode pulses are needed, therefore multi mode operation should be inhibited. Certain embodiments of the present invention provide a thermo-mechanical design that may ensure single longitudinal mode operation when using MCO/VBG lasing devices. Specifically, embodiments of the thermo-mechanical design incorporate a transparent glass enclosure along with other thermally compatible materials. Unwanted modes of operation typically appear if a heat flux formed inside the laser cavity is not well dissipated or controlled and causes CTE misalignment. Therefore, the transparent enclosure is made of fused silica that has a relatively low light absorption characteristic so that some, most, or all of decoupled light can easily exit the cavity. Thus, the absorbed and scattered portions of light that would otherwise generate heat flux resulting in secondary modes are reduced or alleviated. The problem of unwanted heat flux is further resolved by axial symmetrical arrangement of enclosure units having relatively large thermal masses for sinking the generated heat. In this manner, the physical stresses will remain relatively small, thermal gradients will be reduced, and the length of laser cavity will remain relatively consistent during operation. Because the length of the laser cavity is consistent, light energy outside of the major mode may be reduced or eliminated, thus reducing the phenomenon of mode beating.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which:

FIGS. 1A and 1B illustrate an example of the axially symmetric glass packaging concept for a miniaturized solid-state lasing device according to the teachings of the present disclosure;

DETAILED DESCRIPTION

Figure 2:
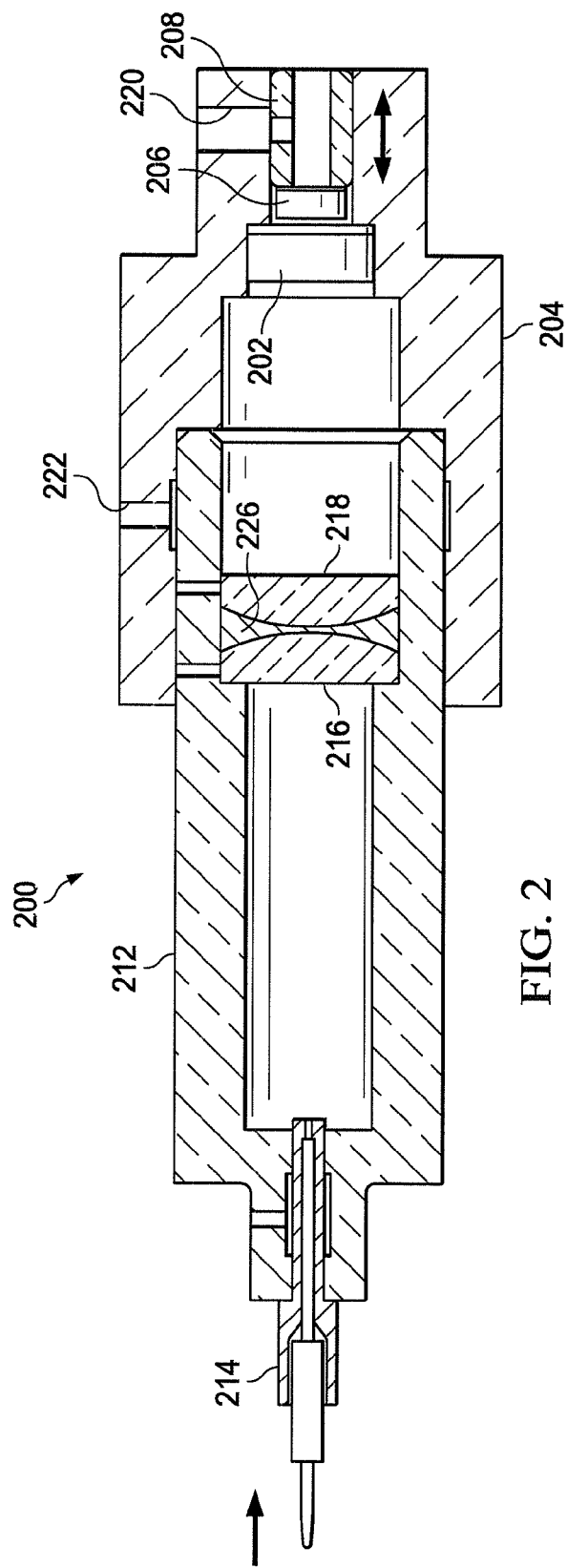
FIG. 2 illustrates the main embodiment of a miniaturized solid-state lasing device according to the teachings of the present disclosure.

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system. Additionally, the drawings are not necessarily drawn to scale.

FIGS. 1A and 1B illustrate an example miniaturized solid-state lasing device 100 according to the teachings of the present disclosure. The solid-state lasing device 100 includes a micro-chip oscillator (MCO) 102 affixed to a first tube 104, and a volume Bragg grating (VBG) plate 106 affixed to a second tube 108 that is configured to be telescopically inserted into the first tube 104 with a slip fit such that the MCO 102 may be concentrically aligned with and is positioned at a specified distance d from the VBG plate 106.

Although micro-chip oscillating lasers (MCOs) have become widely used in laser devices, packaging these devices in suitable structures has heretofore remained a challenge. Certain embodiments of the solid-state lasing device 100 as shown may provide one or more advantages over conventional solid-state lasing device designs. Advantages may include thermally independent operation of the solid-state lasing device 100 facilitating single-mode short pulse lasing. While conventional laser system typically use a laser diode source and a MCO that are both thermally coupled to a common heat sink, heat gradients generated by the MCO 102 and a light generating source in the present disclosure are dissipated separately. Thus, heat management of either component may be handled independently of one another. Another advantage may include excluding and/or reducing any inadvertent multi-mode and/or mixed mode operations. The temperature variations within the laser cavity, resulting in CTE induced intra-cavity spacing changes, and thermal stresses in MCOs often affect multi-mode and/or mixed mode operations. Independent management of thermal gradients generated by the MCO 102 may provide enhanced control over these inadvertent multi-mode and/or mixed-mode operations. Additionally, the solid-state lasing device 100 provides a package in which the wavelength of the single mode light is tunable in order to provide wavelength or phase locking of the generated light beam. Advantages such as these may make the solid-state lasing device 100 conducive to various laser applications, such as tactical laser transmitters, light detection an ranging (LADAR) devices, space sensor systems, space application lasers, and low mass proximity fuses. Additionally, the proposed tubular package encapsulates the optical path to prevent or reduce contamination of the internal optical and laser components.

The MCO 102 is affixed to an end surface 110 of the first tube 102 using a peripheral butt joint. In this particular embodiment, the MCO 102 includes Nd3+YAG and Cr4+YAG bonded plates and dielectric coatings (mirrors) producing a 1064 nanometer pulsed light output. Other embodiments may produce a light output having a wavelength greater than or less than 1064 nanometers. The laser components described herein include composite YAG crystal or YAG ceramic units that can be fabricated by solid phase diffusion bonding. With this arrangement, the Cr4+doped YAG crystals provides passive Q-switching of Nd3+:YAG laser crystals when the layers are bonded together. In particular, the quadrivalent Cr4+-doped garnets exhibit an absorption of approximately 1.0 micron bandwidth with a few microseconds pulse time range. In the case of an Nd3+:YAG laser with 1064 nanometer emission, the absorption band of Cr4+doped YAG allows repetitive Q-switching with the relatively low saturation fluence. Therefore, the composite crystals including Nd3+:YAG and Cr4+:YAG doped layers can form a relatively narrow bandwidth source for 1064 nanometer emission, which extracts laser pulses with high peak power and high repetition rates of passive Q-switching. Although a MCO formed of YAG bonded plates is shown, other embodiments formed of other materials having other types of arrangements may be utilized.

The VBG plate 106 is affixed to an end surface 112 of the second tube 108 using a peripheral butt joint. The VBG plate 106 may include any suitable type such as a Fabri-Perot single glass plate outcoupling means. In one embodiment, the VBG plate 106 may include a volume Bragg grating (VBG) glass plate. The VBG plates are fabricated from photothermo-refractive glass materials and can be used in both low and high-power applications. Additionally, the materials from which the VBG plate is made may have a relatively similar CTE of the tube 108 such that the effect on the length of the tube 108 due to residual stress may be minimized. The micro-optic style hybridization of micro-chip laser with a VBG device provides narrow spectral and high efficiency output capabilities that may reduce the number of modes to one major mode and one adjusted mode. Spectral narrowing and even spectral tuning can be achieved with proper microchip/VBG packaging hybridization at the predetermined spacing between them. In other embodiments, the VBG plate 106 may be made of other materials.

In one embodiment, the first and second tubes 104 and 108 may be made of fused silica, which has a relatively high level of transparency, thus allowing decoupled light to escape. The tubes 104 and 108 may also have substantially greater masses than the MCO 102 and VBG plate 106 for sinking any heat fluxes that are generated. Certain embodiments incorporating fused silica may provide an advantage in that this material has a CTE relatively similar to that of the MCO 102 and VBG plate 106 to which they are attached. Additionally, the laser cavity inside the tubes 104 and 108 are symmetrical around the major optical axis, while joints are peripherally disposed around the major optical axis. In this manner, the physical characteristics may be maintained relatively consistent over large temperature variations.

In addition to thermo-mechanical design features that manage heat fluxes generated during operation, to provide single-mode operation, the effective grating of the VBG plate 106 should be parallel to the MCO's end face and perpendicular to its axis. When used with commercially available prismatic or disc-shaped MCOs having overall dimensions of about 2-5 millimeters, the axial alignment of the VBG plate 106 may require approximately 1.0 micron accuracy in positioning of the VBG plate 106 and MCO 102 with a 20 to 200 micron spacing tolerance. The friction and gap controlled telescoping fit of the second tube 108 in the first tube 104 may provide this level of accuracy.

The MCO 102 and VBG plate 106 may be affixed to the first and second tubes 104 and 108, respectively, in any suitable manner. In one embodiment, high modulus epoxy bonding can be used when the MCO 102, VBG plate 106, and tubes 104 and 106 have compatible thermal coefficients of expansion (CTE). In the case of the thermally mismatched assemblies, the low stress adhesive bonding can be provided by thermo-vulcanized (RTV) silicones having a low Young's modulus. In another embodiment, the secure mounting of the MCO 102 and VBG plate 106 to the tubes 104 and 108 can be achieved by means of metallized surfaces formed on the MCO 102, VBG plate 106, and tubes 104 and 108 that may be soldered together. In both these cases the thermal excursion of the bonded components and holding units may be negligible such that the laser performance is at least partially or mostly stress-independent. In certain embodiments, the soldered and adhesive bonds that are peripheral to the optical axis may provide an organics-free optical path.

The telescopic and peripheral butt joints are peripheral in that their adjoining surfaces extend substantially around the axis of the structure. This peripheral configuration may minimize thermal stretching of the laser cavity, thus providing a relatively stress free assembly with a relatively temperature independent operation. The fully encapsulated and protected optical path excludes at least some, most, or all unwanted contamination, such as dirt or airborne debris. In the arrangement shown, the e-field, thermal, and stress fields are characterized by axial symmetry and separation. That is, the optical signal is configured to travel in an axial direction, while the circumferential physical stresses are maintained at a radial periphery around the axis. Moreover, the thermally induced excursions near the longitudinal axis may therefore be mitigated.

In one embodiment, the fabrication of stress-free and void-free interfaces of oxides with metals is achieved by means of metallization of YAG crystal (YAG ceramic or glass) prior to soldering or brazing the MCO 102 and VBG plate 106 to their respective tubes. To overcome the poor wetting ability of YAG crystal (YAG ceramic or glass), its mating surface may be subjected to surface activation and modification. The surface activation and modification may include decontamination of the mating parts, N-ion plasma-assisted implantation of mating surfaces in laser components with the subsequent metallization, and soldering or brazing of the coated laser components with the Cu—W and/or Cu—Mo sintered composites in which the YAG materials are CTE matched the tube to which it is attached.

The N-ion plasma-assisted implantation may be performed in a vacuum. The vacuum chamber for conventional coating is further equipped with the N-ion discharge source. The implantation technique modifies and activates mating surfaces of crystal, ceramic, and glass, while compensating the depleted oxygen, and improving wetting ability and interaction of the lasing oxide materials with the metal coatings. This bonding technique minimizes voiding in the formed solder pool, thereby providing efficient interfacial heat transfer. The metallization starts immediately after the implantation and is performed in a vacuum in the same coating chamber. In the particular case of low-temperature eutectic soldering (e.g. 63/37 tin/lead (Sn/Pb) or 60/40 Sn/Pb alloys) used for integration of YAG crystals (or ceramics) with Cu—W composite heat spreaders, the metallization coating is formed by the sequentially deposited binder (i.e., chromium (Cr), titanium (Ti), or Cr/Ti combination) with the functional metals (i.e., nickel (Ni) and gold (Au)). These materials are metallurgically compatible with the selected solder. Thus, the solid-state lasing device 100 includes an innovative and efficient fiber-optic type packaging platform having a telescopic arrangement for precise laser cavity and the thermal and stress management features that facilitate precise conditions for single-mode short pulse lasing.

Although FIGS. 1A and 1B illustrate one example of a solid-state lasing device 100, various changes may be made to FIGS. 1A and 1B. For example, the VBG plate 106 may be any type that tunes light from the MCO to produce any suitable mode of operation. Additionally, the first tube 104 and/or the second tube 108 may be configured with a flat surface contour that provides optical axis orientation and facilitates proper clocking prior to fixation.

FIG. 2 illustrates another example miniaturized solid-state lasing device 200 according to the teachings of the present disclosure. Similar to the solid-state lasing device 100 of FIGS. 1A and 1B, the solid-state lasing device 200 includes a micro-chip oscillator (MCO) device 202 affixed to a first tube 204, and a VBG plate 206 affixed to a second tube 208 that is configured to be telescopically inserted into the first tube 204 with a telescoping (slip) fit. The solid-state lasing device 200 also includes a third tube 212 on which a collimated fiber optic assembly (fiber-optic pigtail) 214 is configured. The third tube 212 is configured to be telescopically inserted into an opposing end of the first tube 204 such that the fiber optic input assembly is coaxially aligned with the MCO 202 and the VBG plate 206. The solid-state lasing device 200 also includes a first lens 216 and a second lens 218 configured in the first tube 204.

The first tube 204 and second tube 208 form a telescopic joint with sufficient dimensional tolerances to provide relatively precise axial alignment to achieve a specified spacing between the MCO 202 and the VBG plate 206. Likewise, the first tube 204 and third tube 212 form another telescopic joint providing relatively precise axial alignment of the fiber optic assembly 214 to the MCO 202 and VBG plate 206. In certain embodiments, the telescopic joints may be rotatable relative to one another to provide small angular alignment of the MCO 202 relative to the VBG plate 206 and fiber optic assembly 214.

The MCO 202 is affixed to the first tube 204 and the VBG plate 206 is affixed to the second tube 208 using peripheral butt joints that provide secure mounting of the MCO and VBG plate components with the inner and outer tubes in the formed telescopic assembly. The butt joints may provide minor lateral translations of the microchip and VBG plate resolving full centricity of the mounted assembly.

The tubes 204, 208, and 212 may be formed of any suitable material, such as transparent glass material. The transparent and low absorption glass tubes 204, 208, and 212 provides for purging of fluorescing light, which could be detrimental to the solid-state lasing device's proper operation. Note that the commercial glass capillary units widely used in fiber optic packaging and fiber pig-tailing may be fully applicable for the fabrication of the solid-state lasing device 200.

The adverse effect of fluorescence is resolved through the glass encapsulation of the laser components. The localized heat fluxes and the accompanying temperature gradients that are formed in the laser cavity are equalized inside the high thermal mass and rapid thermal time constant enclosure in accordance with its shape and dimensions. Note that the compact microchip laser has small thermal mass, so the generated heat gradient can be redistributed and partially heat sinked by the thermal spreading tubular enclosure units. The already redistributed and substantially reduced heat fluxes and the accompanying temperature gradients can be further transferred to an active or passive heat sink device. The heat sink arrangement can be configured based on the total dissipated power, microchip radial thermal gradient, thermal time constant, and to further minimize the CTE (coefficient of thermal expansion) induced spacing change between the microchip and outcoupler. In addition to the joining of various crystals, ceramic, or glass components, the techniques provide relatively good interfacial suppression of parasitic oscillations in laser gain medium, while the reflection, scattering, resonance bouncing, thermal excursion, and stress-induced bi-refringence are reduced. Improvements in the interfacial conductance in the thermally manageable laser assembly and YAG crystal (e.g., YAG ceramic or glass) often use a metal coating that is deposited on its mating surface. The metal-coated mating surface of YAG formed member is then soldered or brazed to a metal or conductive composite heat sink. The formed solder pool is fabricated to be void-free, and possible inter-metallic formations further reducing interfacial conductance are reduced. In addition, the proposed technique is focused on joining only CTE matched oxide and metal materials. The global and local mismatch stresses are reduced by means of appropriate material selection and dimensional design of adherent and joining (adhesive and/or soldering) materials. The differential (temperature-dependent) mismatches are also reduced by the design features discussed above. Note that the differential thermal expansion mismatch between the constituent materials introduces the potential for bow and delamination failure in the assembly. Even if the constituent crystal (e.g., ceramic or glass) and metals are thermally matched at a certain temperature such that their differential thermal mismatch is limited within the fabrication and operational cycles. Thus, among the feasible joining techniques, low-temperature soldering and brazing are used for the CTE matched adherent laser and thermal management units.

Holes 220 are formed in the first tube 204 for insertion of an adhesive for bonding the second tube 208 to the first tube 204. Additionally, another hole 222 in formed in the first tube 204 for insertion of an adhesive for bonding the third tube 212 to the first tube 204. Certain embodiments using transparent materials may mitigate the 'blind' assembly nature inherent in many micro opto-electronics assemblies and facilitate downstream quality inspection of the completed laser.

Two lenses 216, 218 are used to focus the light beam. Lens 216 can be fabricated from a molded pre-form and antireflection (AR) coated. Lens 216 formats the pump light. The lens 216 is registered on its planar surface and athermally bonded into the MCO cartridge tube. The lateral surface of the lens 216 and the interior of tubular enclosure bore form a relatively precise telescopic joint. With this arrangement, even in the case of CTE, mismatched glasses used in the tube may be free from undue lateral displacement.

Lens 218 is separated from lens 216 using a spacer 226. The spacer 226 may be fabricated from a suitable low CTE alloy. The lens 218 may also be fabricated from a molded pre-form and equipped with the antireflection (AR) coating. Lens 218 also formats the pump light. The lens 218 is mounted and athermally bonded into the third tube 212.

Although FIG. 2 illustrates one example of a miniaturized solid-state lasing device 200, various changes may be made to FIG. 2. For example, the tubes may be formed of any suitable type material. As a particular example, the each of the first tube 204, the second tube 208, and the third tube 212 may be formed of any combination of materials that provide a relatively similar CTE. Furthermore, the tubes can be made from relatively inexpensive capillary preforms that can be machined to meet desired dimensional tolerances.

Figure 3A:
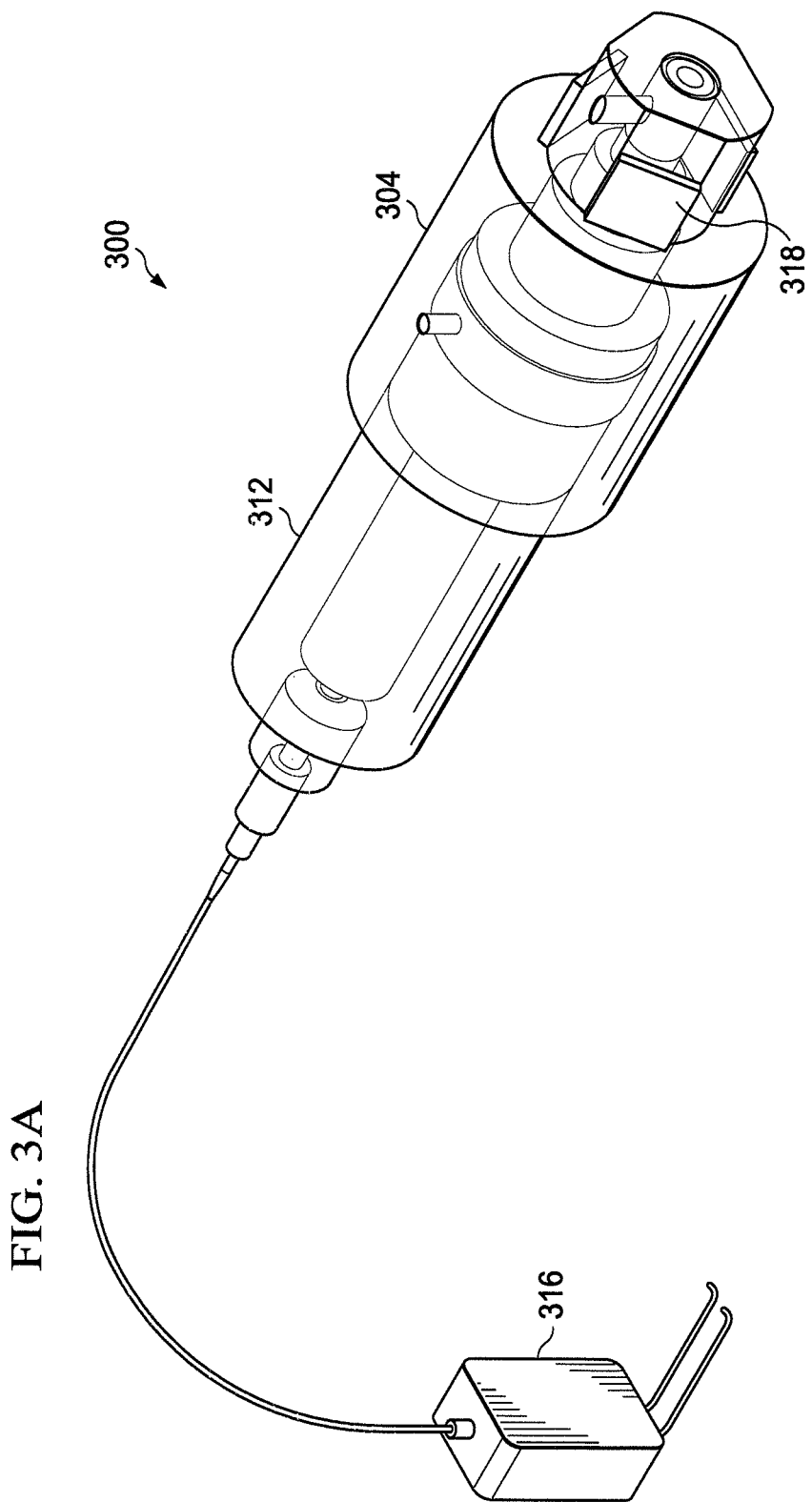
FIGS. 3A and 3B illustrate perspective and exploded views, respectively, of the example solid-state lasing device shown in FIG. 2 with a fiber coupled pump diode according to one embodiment of the present disclosure.
Figure 3B:
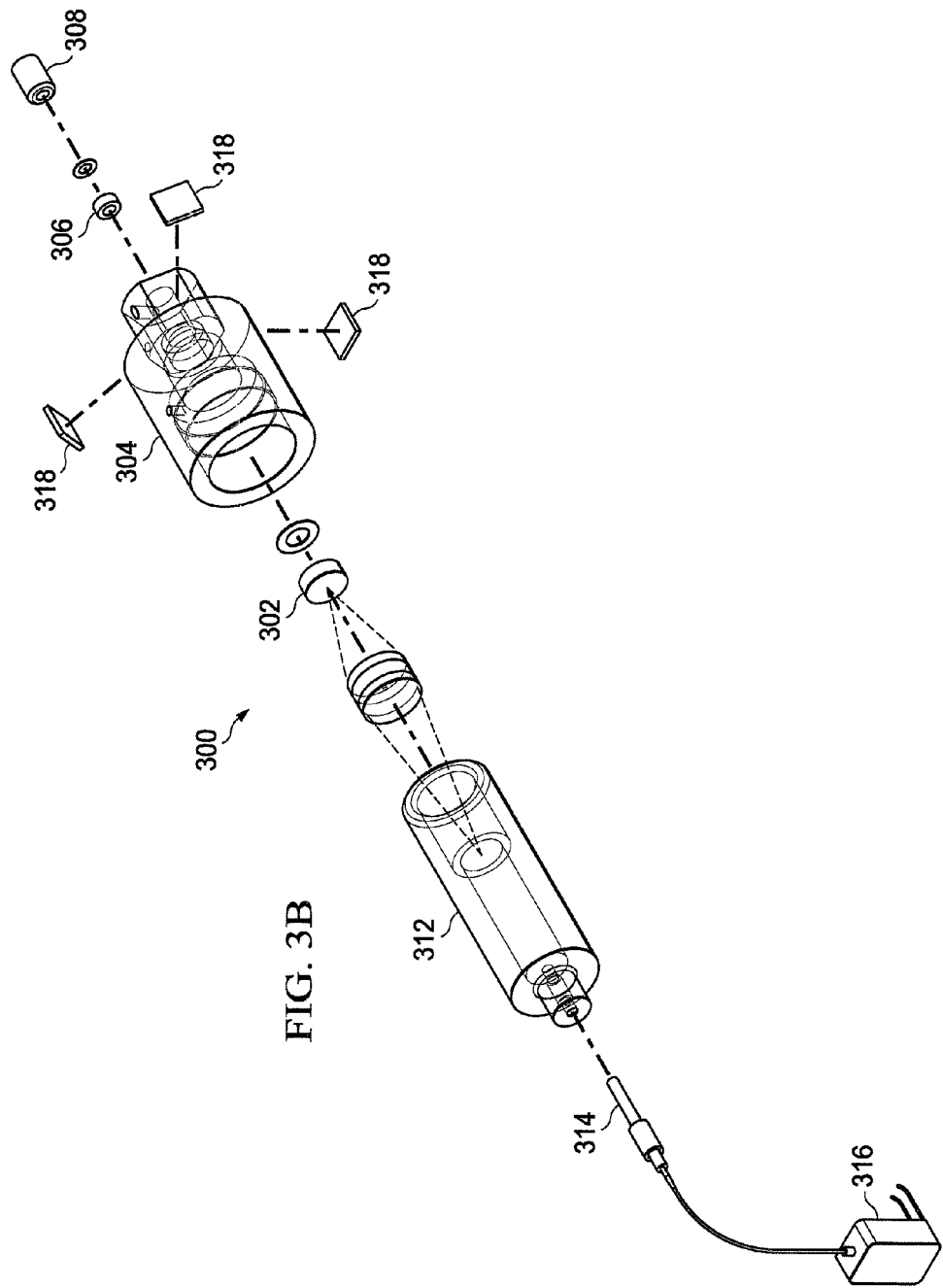

FIGS. 3A and 3B illustrate perspective and exploded views, respectively, of an example solid-state lasing device 300 coupled to a pump diode 316 according to one embodiment of the present disclosure. Similar to the solid-state lasing device 100 of FIGS. 1A and 1B, the solid-state lasing device 300 includes a MCO 302 configured on a first tube 304, a VBG plate 306 configured on a second tube 308, and a fiber optic assembly 314 configured on a third tube 312 that may be coupled together using a telescoping (slip) fit. The solid-state lasing device 300 also includes several heat sink elements 318 configured on the first tube 304. The illustrated views show the component's axial and radial assembly arrangement resulting in a relatively compact laser. The overall package size as shown is approximately 1.0 inch in diameter by 3.0 inches in length and weighs less than 2 ounces. Other embodiments may have dimensional sizes and weights that differ from those described herein.

The heat sink elements 318 in this particular embodiment comprise thermo-electric coolers (TECs) also commonly known as Peltier devices that absorbs heat or thermal energy generated by the MCO 302. Efficient commercial thermal plate spreaders are also applicable due to the relatively small heat flux magnitudes. Additionally, although the solid-state lasing device 300 as shown includes three TECs, other embodiments may include more than three or less than three TECs. The heat sink elements 318 are symmetrically positioned on the outer surface of glass tubular unit and are positioned on the first tube 302 to provide a relatively short heat conduction path to the MCO 302. The heat sink elements 318 are affixed to flattened surfaces around the periphery of the first tube 302. In this manner, heat gradients generated by the absorbing light MCO 302 may be dissipated in a generally coaxial orientation and in redial dominating mode along the axis of the solid-state lasing device 300. Additionally, the heat sink elements 318 may be disposed relatively close to the MCO 302. Certain embodiments having this arrangement may preserve the ability to operate in a single-mode of operation with relatively little spectral modification due to temperature variation. Additionally, such embodiments may be relatively insensitive to temperature induced stretching or shrinking of the laser cavity. Thus, the package's radial symmetry may be preserved at different temperature levels; a relatively important feature for single mode operation.

Certain embodiments may provide an advantage by providing laser power scaling with efficient dissipation of generated heat at varying power levels. Furthermore, the short predominantly radial heat conduction path from the MCO 302 to the heat sink elements 318 mitigates temperature changes and gradients within the gain medium that typically cause fluctuations in lasing characteristics. Additionally, the transparent tubes 304, 306, and 312 permit the fluorescent light to escape without overheating the cavity within the tubes. The shown fiber optic connecting options beyond the ferrule option may accommodate multiplexed pump arrangements and/or remote pump mounting. Also, the tubes 304, 306, and 312 may be configured with relatively thick walls to reduce thermally induced stresses both radially and axially relative to the direction of the optical path.

Although FIGS. 3A and 3B illustrate one example of a miniaturized solid-state lasing device 300 coupled to a pump diode 316, various changes may be made to FIGS. 3A and 3B. For example, the diode pump 316 may include any type of light generating device that generates a column of light suitable for use by the solid-state lasing device 300. Additionally, although the heat sink elements 318 are shown as TECs that actively dissipate heat from the MCO 302, other embodiments may include any suitable type of heat sinking elements that dissipate heat, such as passive heat sink elements (e.g., thermal spreaders).

Figure 4A:
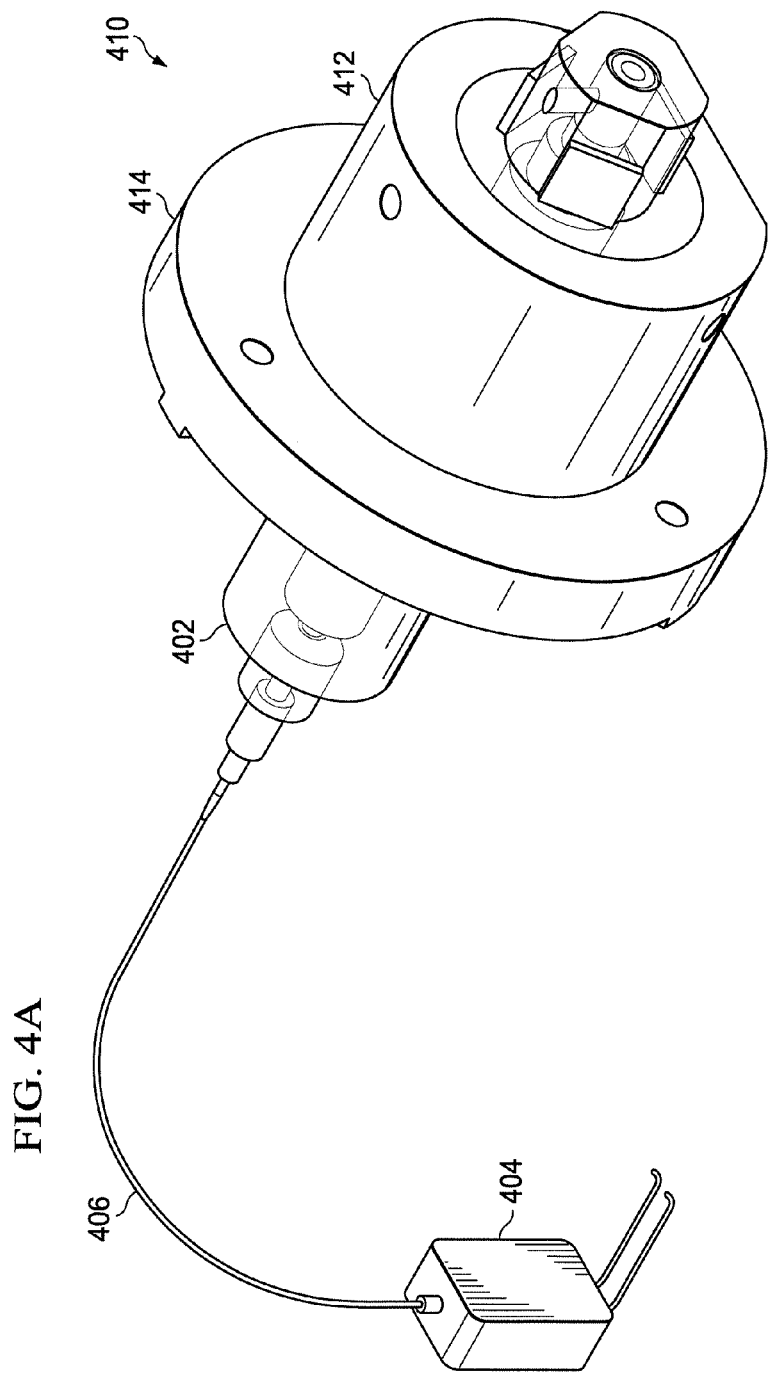
FIGS. 4A, 4B, and 4C illustrate example mounting structures that may be configured on a miniaturized solid-state lasing device according to the teachings of the present disclosure.
Figure 4B:
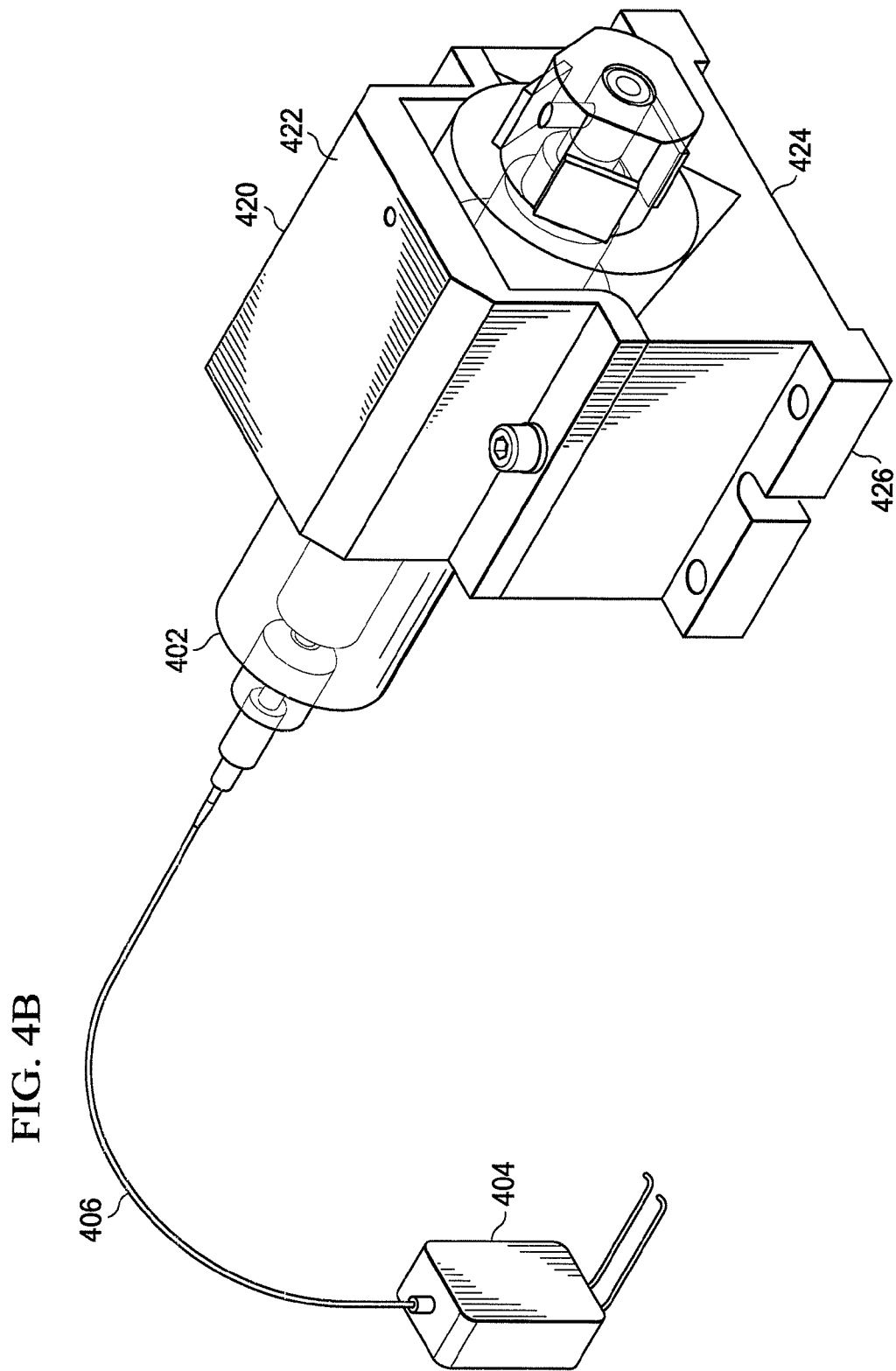
Figure 4C:
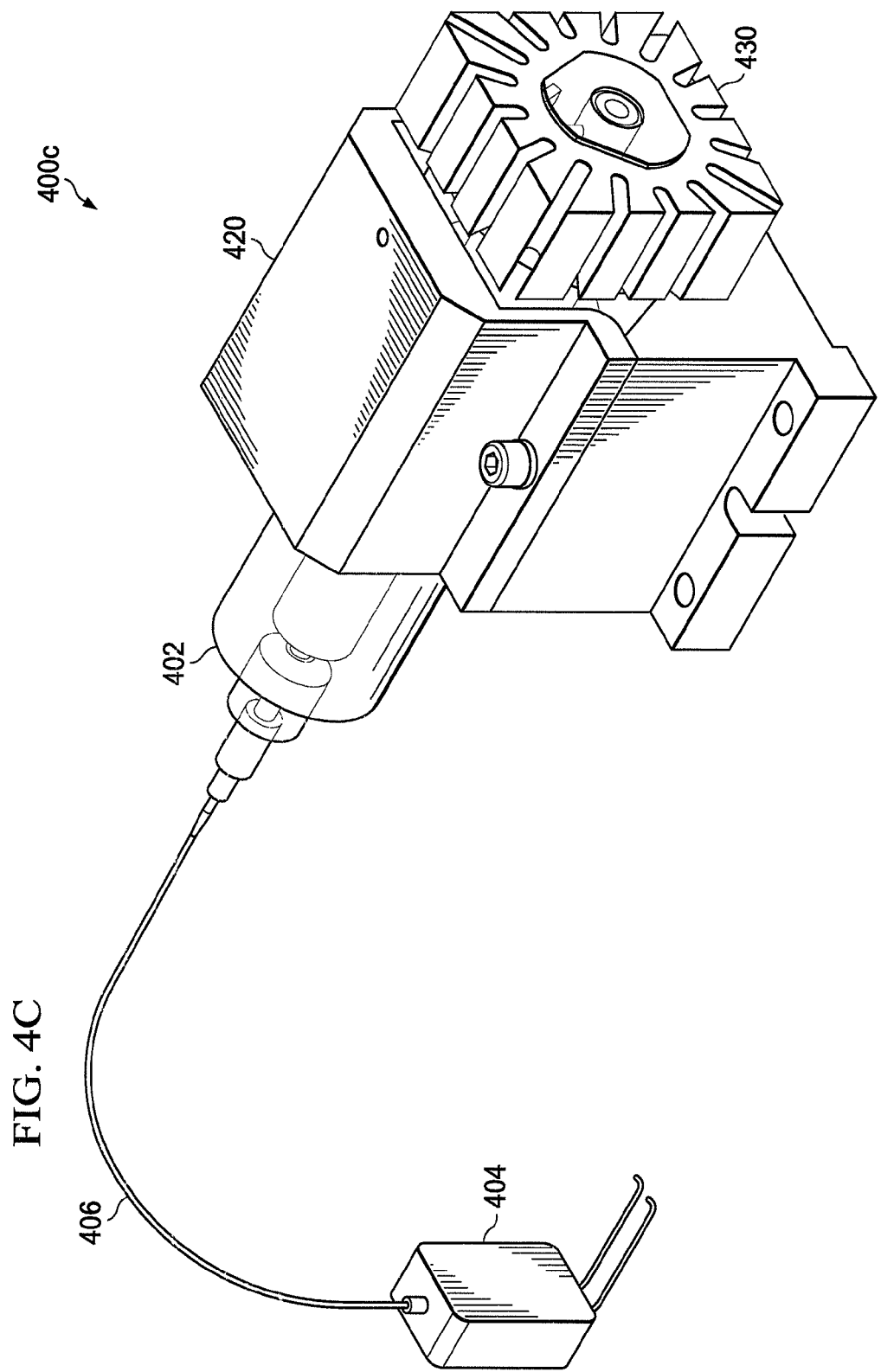

FIGS. 4A, 4B, and 4C illustrate example mounting structures that may be configured on a miniaturized solid-state lasing device according to the teachings of the present disclosure. Like the solid-state lasing device 300 of FIGS. 3A and 3B, the fiber optic assembly 402 of the solid-state lasing device 402 is coupled to a pump diode 404 using an optical fiber 406.

FIG. 4A includes a metal block 410 having a tubular member 412 that houses the solid-state lasing device 402 and a flange 414 with holes for mounting to another structure.

FIG. 4B includes a metal block 420 having a top member 422 that may be bolted to a bottom member 424 for holding the solid-state lasing device 402. The bottom member 424 also includes flanges 426 with holes for mounting to another structure. The bottom member 424 has a V-shaped saddle including internal springs (not shown) for resilient coupling to the solid-state lasing device 402. In this arrangement, the preselected length of fiber optic interconnect permits nearly stress free displacements, including thermally-induced displacements. Having a relatively large thermal mass, the V-shaped saddle of the bottom member 424 provide distributed physical stress on the solid-state lasing device 402 in a relatively uniform manner. Additionally, its cylindrical form factor provides tailorable mounting depending on the application and specific laser system packaging constraints.

FIG. 4C shows a passive heat sink 430 that is mounted with the solid-state lasing device 402 on the metal block 420 of FIG. 4B. The heat sink 430 can be bonded to the assembly's heat generating region using a conductive adhesive to minimize temperature rise across its interface with the solid-state lasing device 402.

Certain embodiments like these may provide a mounting structure that is at least partially or mostly athermalized. The structural parameters of the fiber-optic interconnect between the pump diode 404 and the solid-state lasing device 402 using the metal blocks 410 and 420 provide relatively good structural integrity while reducing optical losses due to relatively small curvatures of the optical fiber.

Although FIGS. 4A, 4B, and 4C illustrate several examples of mounting structures that may be used to mount the solid-state lasing device 402, various changes may be made to FIGS. 4A, 4B, and 4C. For example, the mounting structures may include one or more additional elements for thermal coupling to the heat sink elements configured on the solid-state lasing device 402. Additionally, the mounting structure may also include mounting features, such as rubber grommets that reduce physical shock and vibration energy from being conveyed from a housing on which the mounting structure is mounted to the solid-state lasing device 402.

Figure 5:
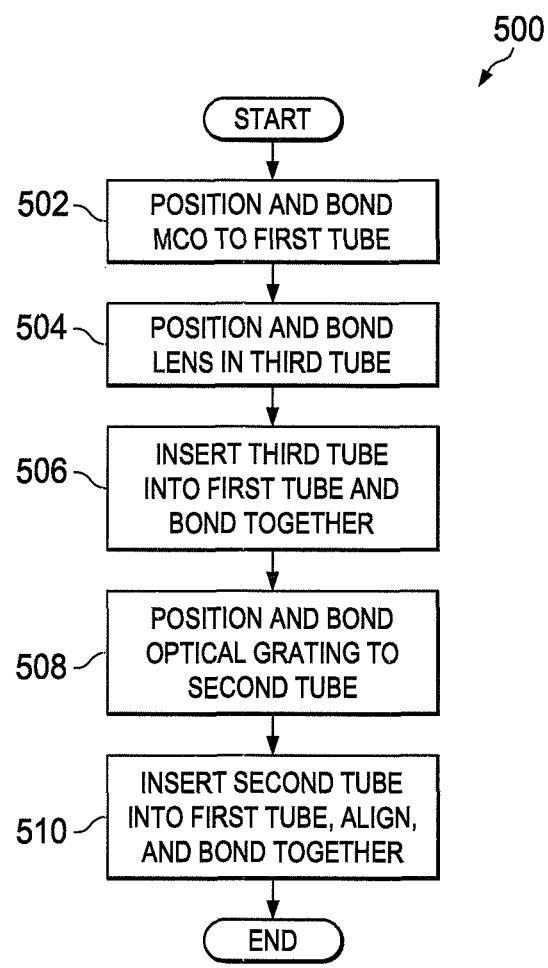
FIG. 5 illustrates an example process for manufacturing the solid-state lasing device according to one embodiment of the present disclosure.

FIG. 5 illustrates an example process 500 for manufacturing the miniaturized solid-state lasing device according to one embodiment of the present disclosure.

In step 502, the MCO is positioned on an end surface of the first tube and bonded thereto using a microwave fused metallized layer or a conventional soldering process. In one embodiment, the MCO may be bonded to the first tube using an air cure, thermal cure, or chemical cure adhesive.

In step 504, the focusing lenses are bonded within the third tube that is configured with the fiber optic assembly. One or more spacers may be inserted between the two lenses to ensure proper relative to one another and to the axis of the tube. In one embodiment, the alignment and optical spot imaging can be established using a target fixture that injects a sample beam of light through the first tube.

In step 506, the third tube is inserted into the first tube. After alignment of the tubes with one another, they may be bonded together using an adhesive injected from a hole configured in the first tube.

In step 508, the VBG plate is affixed to the second tube. In one embodiment, the second tube may include clocking flats that radially align the VBG plate with the solid-state lasing device to reference the grating direction.

In step 510, the second tube is inserted into the first tube, aligned, and bonded using a suitable adhesive. Additionally, heat sinks may be affixed to the first tube using a suitable bonding adhesive. Prior to bonding the first tube to the second tube, alignment may be performed by powering the pump diode while positioning the VBG plate until the desired lasing mode is achieved and becomes single mode that is relatively stable over time. Thereafter the fabrication process of the solid-state lasing device is completed.

Although FIG. 5 illustrates one example of a method 500 for fabricating a miniaturized solid-state lasing device, various changes may be made to FIG. 5. For example, while shown as a series of steps, various steps in FIG. 5 could overlap, occur in parallel, occur in a different order, or occur multiple times.

Figure 6:
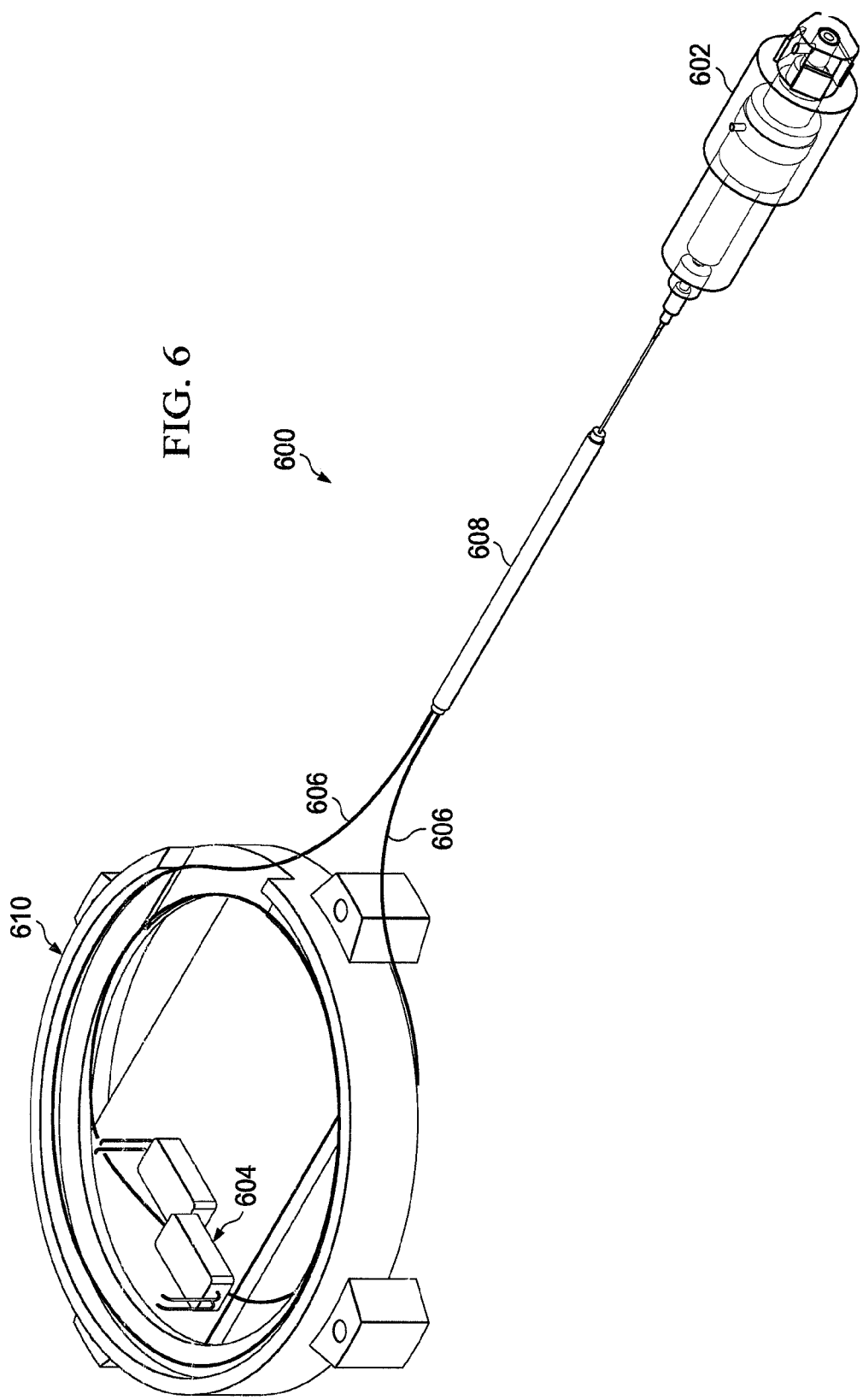
FIG. 6 illustrates an example optical assembly that includes a fiber optic coupler and remotely mounted pump optic fiber spool with a miniaturized solid-state lasing device according to one embodiment of the present disclosure.

FIG. 6 illustrates an example optical assembly 600 according to one embodiment of the present disclosure. The optical assembly 600 includes a miniaturized solid-state lasing device 602 optically coupled to two light generating devices 604, such as diode pumps through two corresponding optical fibers 606 and a coupler 608. The spool 610 provides a frame for holding the optical fibers 606 in a coiled shape.

The light generating devices 604 often generate substantially more heat when the MCO is configured in the solid-state lasing device 602. The optical assembly 600 therefore provides physical separation of the light generating devices 604 from the solid-state lasing device 602 such that their heat dissipation may be managed separately. Moreover, heat dissipation of the solid-state lasing device 602 should be managed with a greater level of precision than that of the light generating devices 604 in order to provide proper operation in single-mode regime. By remotely mounting the solid-state lasing device 602 relative to the light generating devices 604, the solid-state lasing device 602 having temperature sensitive single mode MCO/VBG components will be thermally decoupled from the diode assembly and its separate heat sinking unit. The spool 610 provides a mounting structure and forms a heat sink for the light generating devices 604. The spool 610 is fabricated from a heat conductive alloy with embedded V-groove features for precision positioning of the optical fiber cables 606 and mounting/guiding segments. The spool's large thermal mass relative to the small mass of fiber makes it an efficient thermal spreader for heat generated in the curved fiber.

The coupler 608 is provided to sum the light beams generated by the two light generating devices 604. In other embodiments, the optical assembly 600 may have any suitable number of light generating devices (e.g., laser pumping diodes), such as one light generating device or more than two light generating devices. For example, a battery comprising four to sixteen light generating devices mounted on a cylindrical spool in a manner similar to that shown herein. Commercially available couplers as shown may provide power scaling through the selection of the proper coupler combination ratio. This arrangement may also provide selection of light beams from certain or specific light generating devices to be injected into the solid-state lasing device 602.

Figure 7:
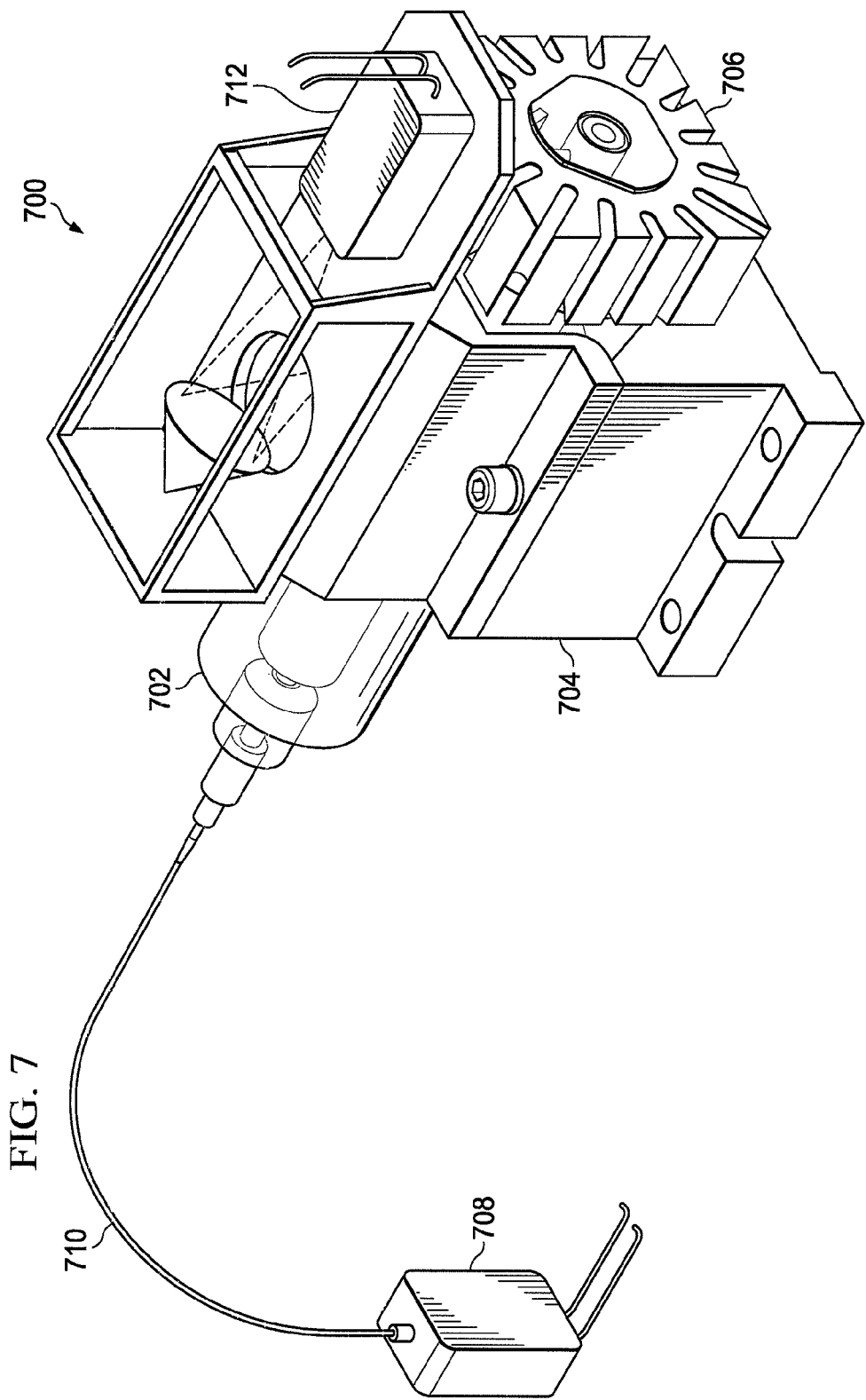
FIG. 7 illustrates another example optical assembly that includes a solid-state lasing device with Q-switch bleaching and combination optical mount and passive heat sink according to one embodiment of the present disclosure.

FIG. 7 illustrates another example optical assembly 700 according to one embodiment of the present disclosure. Like the optical assembly of FIG. 4C, the optical assembly includes a miniaturized solid-state lasing device 702 configured in a metal block 704, thermally coupled to a passive heat sink 706, and optically coupled to a light generating device 708 through a section of optical fiber 710. The optical assembly 700 also includes a passive Q-switch bleaching light generating device 712 that injects a pump light beam into the MCO Q-switch layer to optically bleach the laser cavity in the solid-state lasing device for pulse repetition frequency setting and precise pulse timing control. The bleach light generating device 712 is mounted to an integral heat sink for thermal management in the above described manner.

Additionally, the laser cavity in the solid-state lasing device may also include two dielectric interference coatings (mirrors) having high laser damage resistance, such as antireflection (AR) and dichroic dielectric coatings. The dichroic interference filter coating includes the high reflection and antireflection (HR/AR) segments, therefore reflecting certain wavelengths (e.g., pump) and transmitting other (operational) wavelength. Both these coatings are formed by interference thin films of high and low refractive index oxide materials, such as Ta2O5/SiO2 films. This type of film may provide relatively good laser damage resistance, which is important primarily for the bleaching laser diode pump 712.

Although FIG. 7 illustrates one example of an optical assembly 700 that includes the solid-state lasing device 602, various changes may be made to FIG. 7. For example, although the light generating device 712 as shown comprises a diode pump that introduces a bleach beam into the MCO cavity through a porthole in the first tube, the light generating device 712 may be remotely configured from the mounting structure and optically coupled to the solid-state lasing device 702 through another optical fiber (not shown).

The mounting structures may include one or more additional elements for thermal coupling to the heat sink elements configured on the solid-state lasing device 402. Additionally, the mounting structure may also include mounting features, such as rubber grommets that reduce physical shock and vibration energy from being conveyed from a housing on which the mounting structure is mounted to the solid-state lasing device 402.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A solid-state lasing device comprising:
a micro-chip oscillator (MCO) affixed to a first tube; and
a volume Bragg grating (VBG) plate affixed to a second tube, the second tube configured to be telescopically coupled to the first tube with a slip fit such that the VBG plate is concentrically aligned with and is positioned at a specified distance from the MCO;
wherein the first tube comprises a recess configured to receive at least a portion of the second tube, the recess terminating at the MCO; and
wherein at least the portion of the second tube is affixed to the VBG plate and is configured to fit within the recess such that the VBG plate is positioned within the first tube adjacent to the MCO.

2. The solid-state lasing device of claim 1, wherein:
the first tube comprises an end surface that is perpendicular to an axis of the first tube; and
the MCO is affixed to the end surface with a butt joint.

3. The solid-state lasing device of claim 2, wherein the MCO is affixed to the end surface with a metalized layer.

4. The solid-state lasing device of claim 1, wherein:
the second tube comprises an end surface that is perpendicular to an axis of the second tube; and
the VBG plate is affixed to the end surface with a butt joint.

5. The solid-state lasing device of claim 1, further comprising a heat sink configured to dissipate heat from the MCO, wherein the heat sink comprises at least one of a Peltier device and a passive heat spreader.

6. The solid-state lasing device of claim 1, wherein the first tube and the second tube comprise glass.

7. The solid-state lasing device of claim 1, further comprising a third tube affixed to a fiber optic input assembly, the third tube configured to be telescopically coupled to the first tube with a second slip fit such that the fiber optic input assembly is concentrically aligned with the MCO.

8. The solid-state lasing device of claim 1, further comprising a light generating device optically coupled to an optical fiber.

9. The solid-state lasing device of claim 8, wherein the light generating device comprises a diode pump.

10. A solid-state lasing device comprising:
a micro-chip oscillator (MCO) affixed to a first tube;
a volume Bragg grating (VBG) plate affixed to a second tube, the second tube configured to be telescopically coupled to the first tube with a slip fit such that the VBG plate is concentrically aligned with and is positioned at a specified distance from the MCO;
a light generating device optically coupled to an optical fiber, the optical fiber optically coupled to the MCO; and
a spool configured to hold the optical fiber in a coil shape and dissipate heat from the light generating device.

11. A method comprising:
affixing a micro-chip oscillator (MCO) to a first tube;
affixing a volume Bragg grating (VBG) plate to a second tube; and
telescopically coupling the second tube to the first tube with a slip fit such that the VBG plate is concentrically aligned with and is positioned at a specified distance from the MCO;
wherein the first tube comprises a recess that receives at least a portion of the second tube, the recess terminating at the MCO; and
wherein at least the portion of the second tube is affixed to the VBG plate and fits within the recess such that the VBG plate is positioned within the first tube adjacent to the MCO.

12. The method of claim 11, wherein affixing the MCO to the first tube comprises affixing the MCO to an end surface of the first tube with a butt joint, the end surface perpendicular to an axis of the first tube.

13. The method of claim 12, wherein the MCO is affixed to the end surface with a metalized layer.

14. The method of claim 11, wherein affixing the VBG plate to the second tube comprises affixing the VBG plate to an end surface of the second tube with a butt joint, the end surface perpendicular to an axis of the second tube.

15. The method of claim 11, further comprising placing a heat sink on the first tube, the heat sink configured to dissipate heat from the MCO, wherein the heat sink comprises at least one of a Peltier device or a passive heat spreader.

16. The method of claim 11, wherein the first tube and the second tube comprise glass.

17. The method of claim 11, further comprising:
affixing a third tube to a fiber optic assembly; and
telescopically coupling the third tube to the first tube with a second slip fit such that the fiber optic assembly is concentrically aligned with the MCO.

18. An optical light generating system comprising:
a solid-state lasing device comprising:
  a micro-chip oscillator (MCO) affixed to a first tube; and
  a volume Bragg grating (VBG) plate affixed to a second tube, the second tube configured to be telescopically coupled to the first tube with a slip fit such that the VBG plate is concentrically aligned with and is positioned at a specified distance from the MCO; and
a light generating device optically coupled to the solid-state lasing device using an optical fiber;
wherein the first tube comprises a recess configured to receive at least a portion of the second tube, the recess terminating at the MCO; and
wherein at least the portion of the second tube is affixed to the VBG plate and is configured to fit within the recess such that the VBG plate is positioned within the first tube adjacent to the MCO.

19. The optical light generating system of claim 18, wherein the light generating device comprises a diode pump.

20. An optical light generating system comprising:
a solid-state lasing device comprising:
  a micro-chip oscillator (MCO) affixed to a first tube; and
  a volume Bragg grating (VBG) plate affixed to a second tube, the second tube configured to be telescopically coupled to the first tube with a slip fit such that the VBG plate is concentrically aligned with and is positioned at a specified distance from the MCO;
a light generating device optically coupled to the solid-state lasing device using an optical fiber; and
a spool configured to hold the optical fiber in a coil shape and dissipate heat from the light generating device.

* * * * *